United States Patent
Bentele-Calvör et al.

(10) Patent No.: US 7,126,239 B2
(45) Date of Patent: Oct. 24, 2006

(54) METHOD FOR TRIPPING AT LEAST ONE RESTRAINING MEANS

(75) Inventors: Stephan Bentele-Calvör, Stuttgart (DE); Torsten Grotendiek, Bietigheim-Bissingen (DE); Klaus Mindner, Esslingen (DE); Frank Thiel, Markgroeningen (DE); Sabine Aust, Stuttgart (DE); Andrea Link, München (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 10/149,729

(22) PCT Filed: Sep. 19, 2001

(86) PCT No.: PCT/DE01/03599

§ 371 (c)(1),
(2), (4) Date: Oct. 24, 2002

(87) PCT Pub. No.: WO02/30715

PCT Pub. Date: Apr. 18, 2002

(65) Prior Publication Data

US 2003/0173827 A1    Sep. 18, 2003

(30) Foreign Application Priority Data

Oct. 13, 2000   (DE) .............................. 100 50 956

(51) Int. Cl.
*B60B 21/16* (2006.01)

(52) U.S. Cl. ....................................... 307/10.1; 280/735
(58) Field of Classification Search ............ 361/19–23; 307/9.1, 10.1, 10.3, 10.4, 10.2; 280/735; 701/35

See application file for complete search history.

(56) References Cited

U.S. PATENT DOCUMENTS

| | | | | |
|---|---|---|---|---|
| 5,037,129 A | * | 8/1991 | Fritz et al. ................... | 280/734 |
| 5,173,614 A | * | 12/1992 | Woehrl et al. ............. | 307/10.1 |
| 5,892,435 A | * | 4/1999 | Buchheim et al. .......... | 340/438 |
| 6,005,479 A | * | 12/1999 | Ide .............................. | 340/438 |
| 6,095,554 A | * | 8/2000 | Foo et al. .................... | 280/735 |
| 6,198,387 B1 | * | 3/2001 | Dalum et al. ............... | 340/436 |
| 6,243,632 B1 | * | 6/2001 | Jung ............................ | 701/45 |
| 6,256,563 B1 | * | 7/2001 | Blank et al. ................. | 701/45 |
| 6,530,597 B1 | * | 3/2003 | Nesper et al. .............. | 280/735 |

FOREIGN PATENT DOCUMENTS

| | | |
|---|---|---|
| DE | 38 16 588 | 9/1989 |
| DE | 42 23 562 | 9/1993 |
| DE | 198 07 124 | 9/1999 |

* cited by examiner

Primary Examiner—Brian Sircus
Assistant Examiner—Danny Nguyen
(74) Attorney, Agent, or Firm—Kenyon & Kenyon LLP

(57) ABSTRACT

A method for triggering at least one restraint means, triggering signals from peripheral acceleration sensors being released by signals from centrally situated acceleration sensors. In this context, a release threshold is raised in the case of a detected misuse behavior, or the release for the triggering signals is blocked.

10 Claims, 3 Drawing Sheets

METHOD FOR TRIPPING AT LEAST ONE RESTRAINING MEANS

FIELD OF THE INVENTION

The present invention relates to a method for triggering at least one restraint means.

BACKGROUND INFORMATION

Peripheral acceleration sensors in a vehicle measure accelerations in the vicinity of an impact location during an accident. These are used to then decide whether the restraint means are to be triggered. If there is a triggering signal from such peripheral acceleration sensors (satellites), this triggering signal is tested by a central control unit to determine whether it may be released. A plausibility check follows. For this purpose, the central control unit itself has acceleration sensors for determining this. This is relevant above all for side impact detection.

SUMMARY OF THE INVENTION

The method of the present invention for triggering at least one restraint means may have the advantage that a potentially occurring unintentional triggering during driving maneuvers such as driving through potholes or driving over curbs may be able to be better suppressed. Therefore, such driving maneuvers may not cause the restraint means to be triggered. In this context, the acceleration sensors in the central control unit may be situated such that they detect the acceleration as fast as the peripheral acceleration sensors. If a characteristic as occurs in the case of a pothole or when driving over a curb is detected, a release threshold may be raised for a predefined time or the release may be blocked for a second predefined time in order to thus suppress unintentional triggering signals for the restraint means. In this instance, the acceleration values as well as the integrated or cumulative accelerations may be examined for the plausibility check.

It may be particularly advantageous that there is a rescue band in order to be able to release the restraint means in the case of an accident even in the case of an increased release threshold or a blocked release. For this purpose, the cumulative transversal accelerations may be compared to the rescue band. This may be of interest above all in the case of a side impact.

It may be advantageous that the method of the present invention first starts when a noise range for the accelerations is exceeded. Consequently, minimal accelerations may resulting from unevenness in a roadway may be suppressed.

Moreover, it may be advantageous that an integrator that is realized as software or hardware may be used for summing up the accelerations.

Summing up the acceleration values may cause the integration signals to be more harmonic. A filtering may occur in comparison with the acceleration signal. Consequently, statements may be able to be made about the total course of a crash, while accelerations only represent an instantaneous survey.

It may also be advantageous that the triggering thresholds in the case of the peripheral acceleration sensors may be adjusted as a function of the change in the accelerations. If the acceleration changes significantly in this context as a function of time, the triggering thresholds may be lowered in order to cause the restraint means to be triggered in the case of a collision event. In this context, the change in the acceleration may be quantized as a function of time in order to thus assign a change in the triggering threshold to an interval of acceleration changes.

Finally, a device for implementing the method of the present invention may be provided that has peripheral acceleration sensors and centrally situated sensors. The centrally situated sensors may be connected to a control device for triggering the at least one restraint means. The peripheral acceleration sensors may be able to be connected to the centrally situated acceleration sensors and the control unit. In this context, the centrally situated acceleration sensors may be provided in different sensing directions. This means that there may be sensors in the X and the Y direction, the X sensors may sense the acceleration in the travel direction and the Y sensors may sense the acceleration in the lateral direction, so that a side impact may consequently be able to be detected. Alternatively, it may also be possible in this context for the centrally situated sensors each to be installed offset from one another at +/−45° to the travel direction axis.

DETAILED DESCRIPTION

Restraint means such as airbags and belt tighteners are increasingly used in greater numbers in motor vehicles. In this context, avoiding the unintentional triggering of airbags is an important objective for preventing injuries to the vehicle occupants. Driving maneuvers such as driving over a curb or through a pothole may be so-called misuses in which case it may not be necessary to trigger the restraint means. Therefore, the triggering, even if requested by a satellite, may be suppressed in such a case.

A method for triggering at least one restraint means may be used that detects such misuses using centrally situated acceleration sensors and suppresses a triggering signal from peripheral acceleration sensors for a predefined time provided that the signals from the centrally situated acceleration sensors do not exceed a predefined rescue band or existing release threshold. Accelerations in the lateral directions of the vehicle as well as cumulative accelerations in the travel and lateral direction of the vehicle may be examined for this purpose.

Figure 1:
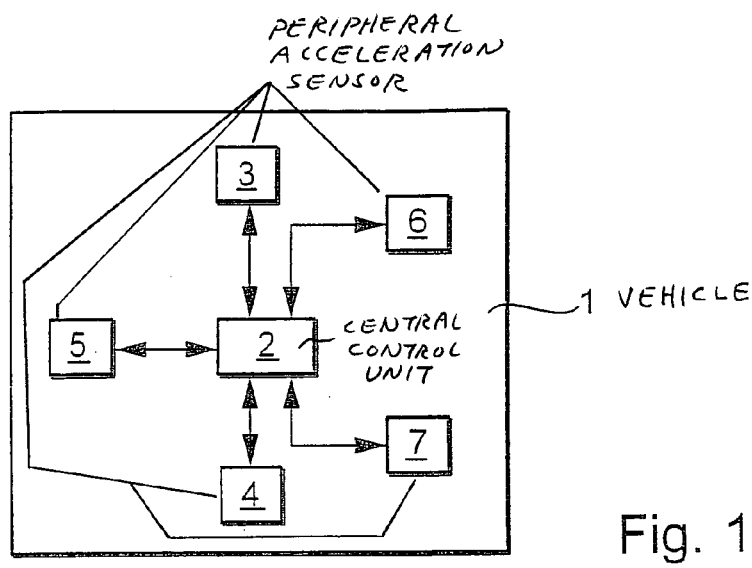
FIG. 1 shows an exemplary configuration of acceleration sensors in the vehicle.
Figure 2:
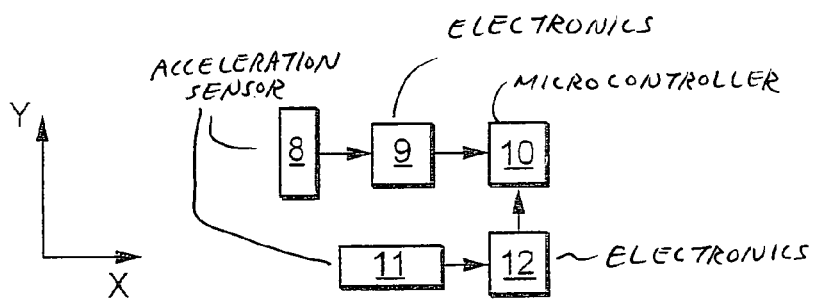
FIG. 2 shows centrally situated acceleration sensors in the vehicle that are positioned in different sensing directions.

A configuration of acceleration sensors in a vehicle is represented in FIG. 1. Vehicle 1 may have a central control unit 2 in the vehicle that may be situated at the vehicle tunnel, for example. As shown in FIG. 2, central control unit 2 may have acceleration sensors 8 and 11, which may each be situated in the X and Y direction, 0°/90° concepts and +/−45° concepts may be usable. 0° may corresponds to the x axis and 90° may correspond to the y axis.

Acceleration sensor 8 may be connected to electronics 9, which may amplify and digitize the acceleration signal, so that a microcontroller 10 as a processor to which one data output of electronics 9 is connected may be able to process the acceleration signal from acceleration sensor 8. An electronics 12, which may process the signals from acceleration sensor 11 in the same manner, may be connected to a second data input of microcontroller 10. The amplification of electronics 9 or 12 may alternatively also be assigned to acceleration sensors 8 and 11, so that an acceleration sensor and a measured value amplifier may be on a chip. The analog-digital conversion may be assigned to microcontroller 10, which may then have analog inputs to which the acceleration sensors may be connected.

Central control unit 2 may be connected via a first data input/output to a peripheral acceleration sensor 3, via a second data input/output to a peripheral acceleration sensor 4, via a third data input/output to a peripheral acceleration sensor 5, via a fourth data input/output to a peripheral acceleration sensor 6, and via a fifth data input/output to a peripheral acceleration sensor 7. These connections may alternatively also be made via a bus, a sensor bus, or a triggering bus.

Peripheral acceleration sensors 3, 4, 5, 6, and 7 may each have a respective control device, so that if need be triggering signals may be transmitted to central microcontroller 10. Alternatively, it may also be possible for peripherally situated acceleration sensors 3 through 7 to have an electronics that may solely amplify and digitize the acceleration signals and for the acceleration signals to be centrally processed in microcontroller 10. A mixed assembly with components of both concepts may also be possible here. Peripheral acceleration sensors 3 through 7 may be positioned for sensing side impact as well as for sensing front impact. In this context, peripheral acceleration sensor 5 may be provided for the front impact sensing. It may be possible for additional sensors to be housed in different parts of the vehicle and to be connectable to central control unit 2. It may also be possible to use less acceleration sensors than shown here.

Figure 3:
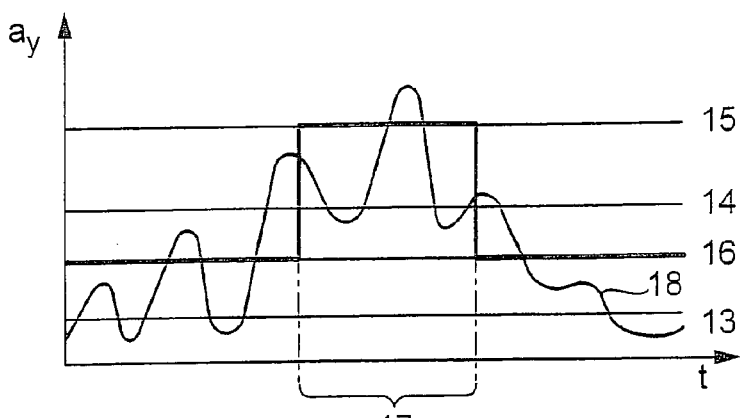
FIG. 3 shows a diagram for representing an exemplary method of the present invention.

Shown in FIG. 3 is an acceleration-time diagram that displays an acceleration signal 18 from acceleration sensor 8, which may measure the acceleration in the Y direction, e.g. the lateral direction of vehicle 1, as a function of time. Therefore, the ordinate of the diagram is marked by $a_y$ and the abscissa by t.

This acceleration signal 18 may be compared here to different thresholds 13, 14, 15, and 16. If acceleration signal 18 exceeds threshold 13 for the first time, the method and the present invention may begin and may continue to be carried out even when threshold 13 is no longer being exceeded. Therefore, threshold 13 may represent the noise band. Thresholds 13, 14, 15, and 16 shown here may be symmetrical about the abscissa in order to measure accelerations in both directions, i.e. +Y and −Y, +Y accelerations may mean from the right and −Y accelerations may mean from the left in this instance.

Threshold 16 may initially represent the release threshold. If a satellite 3-7 transmits a triggering signal, microcontroller 10 may check whether acceleration signal 18 is above threshold 16. If that is the case, the restraint means may be released to be activated. If that is not the case, the restraint means may not be released to be activated.

If threshold 14 is exceeded by the acceleration signal, but threshold 15 is not exceeded, an acceleration indicating a misuse, i.e. driving through a pothole or over a curb, may be detected. Therefore, it may be necessary in some instances to suppress the triggering signal. The release threshold may therefore be increased from threshold value 16 to threshold value 15 for a time 17. The algorithm may thereby become less sensitive.

Thresholds 13 and 16 may be at several G (gravitational acceleration), while thresholds 14 and 15 may well be over 10 G. In response to an acceleration signal between thresholds 14 and 15, the release threshold for centrally situated Y sensor 8 may be raised to value 15 for predefined time 17. Consequently, the triggering algorithm described here may become less sensitive. If during time 17 the release threshold at value 15 is exceeded by the acceleration signal, and satellite 3-7 still transmits a triggering signal, the restraint means may be released for activation.

Release threshold 16 may be raised to value 15 for predefined time 17, which may be determined from experimental data. This experimental data may be laid out such that driving over a curb or through a pothole, for example, may be measured over time, so that the method of the present invention may be available again as quickly as possible for detecting an impact in order to provide optimum protection for the vehicle occupants. The underlying triggering algorithm that may be run in control unit 2 on processor 10 may be refined in that threshold 16 may only be raised when acceleration signal 18 shows a maximum in the acceleration range between thresholds 14 and 15 and does not pass through this interval to increase further. When acceleration signal 18 exceeds release threshold 15, a triggering signal from peripheral acceleration sensors may be released. In this case, there may be an impact at high speeds.

It may be provided in a further refinement for the cumulative acceleration signal of Y acceleration sensor 8 to also be compared to a fixed rescue band that may be a threshold value that may be symmetrical to the time axis. When this rescue band is exceeded by the cumulative acceleration signal, a so-called side impact may exist, and a triggering signal from peripheral acceleration sensor 3-7 may be released. This may be the case in particular when the acceleration signal is still under threshold 14.

Figure 4:
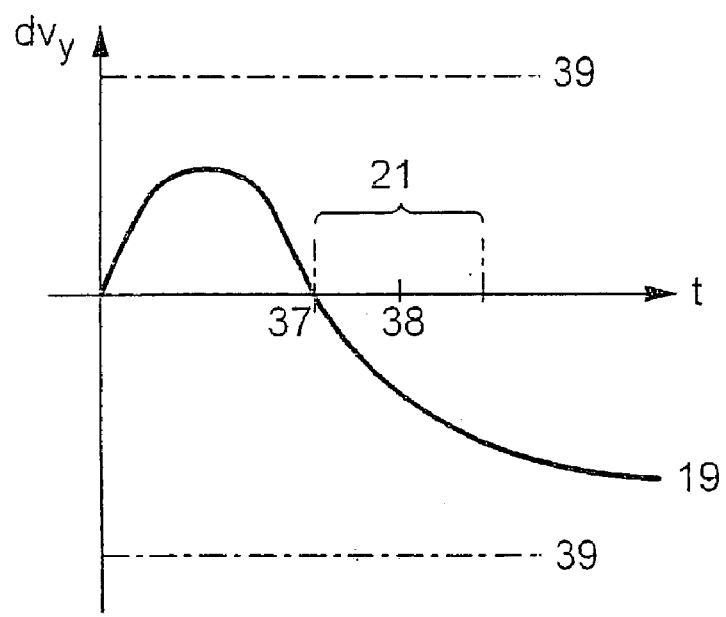
FIG. 4 shows a second diagram for representing an exemplary method of the present invention.

Shown in FIG. 4 is a cumulative acceleration signal time diagram in which cumulative acceleration signal 19 $dv_y$ in the Y direction, i.e. in the transverse direction of the vehicle, may be checked as a function of time for a zero crossing and consequently for a sign change. The zero crossing may be viewed here as the threshold value, namely the time axis, being exceeded.

The ordinate indicates the cumulative acceleration signal in the Y direction, while the abscissa indicates the time. Therefore, the ordinate may be designated by $dv_y$ and the abscissa by t. If accelerations are summed up, there may be a speed signal, the acceleration being integrated in particular in this instance.

If the zero crossing of the cumulative acceleration signal is detected, as soon as the triggering request (triggering signal) of the satellite occurs within predefined time 38, a release for the triggering signal may be blocked for a predefined time 21. Cumulative acceleration signal 19 of central acceleration sensor 8, of the Y acceleration sensor in this instance, may have a sign change after a predefined time after the start of the algorithm or of the method of the present invention, so that blocking may be able to occur. Time 37, which signal 19 may need to experience a zero crossing and consequently a sign change, may therefore be less than predefined time 38. This may prevent the cumulative acceleration signal from not being observed for a long measuring time with respect to the zero crossing for the blocking.

A rescue band 39 may then be symmetrically situated and cumulative acceleration signal 19 may exceed this threshold 39 to generate a release signal for a triggering signal from a peripheral acceleration sensor. This rescue band 39 may be present to permit the detection of a side impact despite the detected misuse.

Figure 5:
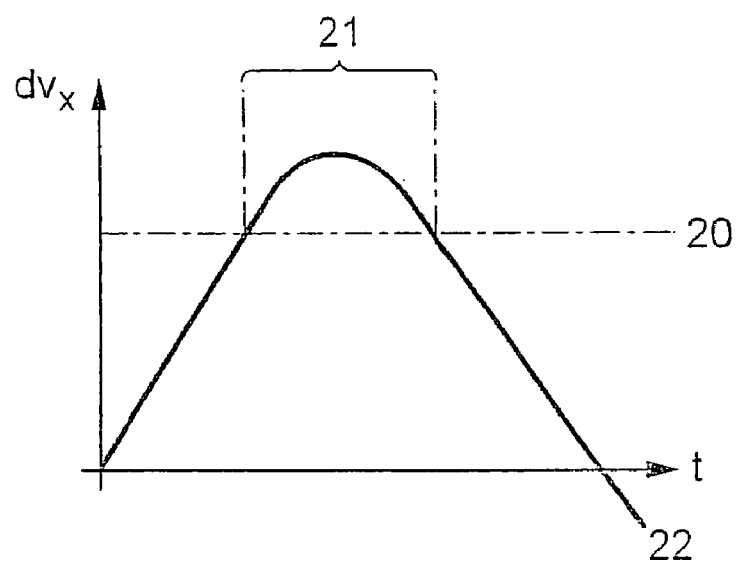
FIG. 5 shows a third diagram for representing an exemplary method of the present invention.

Shown in FIG. 5 is a further diagram that may represent cumulative accelerations $dv_x$ as a function of time. In this instance, the acceleration signal from X acceleration sensor 11 may be integrated (signal 22) and compared to a fixed threshold value 20. As soon as this value 20 is reached, the blocking may be carried out for predefined time 21. This blocking may only be able to be overridden by signal 19 from the Y sensor when rescue band 39 is exceeded.

Figure 6:
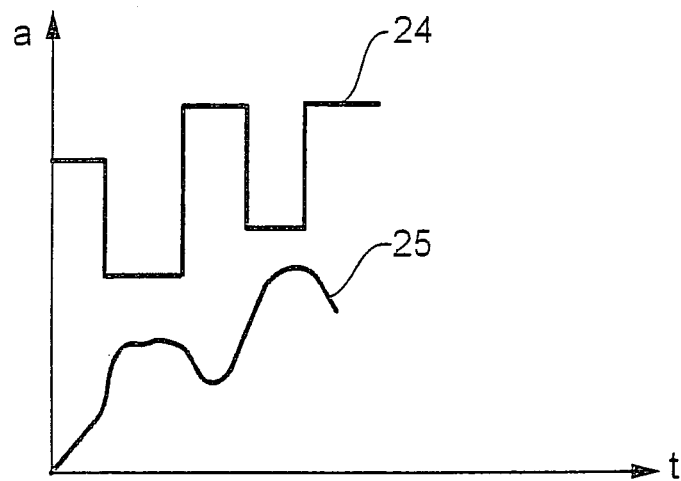
FIG. 6 shows a diagram for illustrating the change in the triggering threshold as a function of acceleration changes.

FIG. 6 shows how triggering threshold 24 is changed as a function of changes in acceleration signal 25 of a peripheral acceleration sensor. The diagram in FIG. 6 shows an acceleration-time diagram, acceleration signal 25 changing its slope. Acceleration a may be marked off on the ordinate while time t is on the abscissa. If the slope changes significantly, threshold 24 may be lowered for a predefined time to then return to a neutral value. If acceleration signal 25 again shows a significant change, triggering threshold 24 may be raised as a function of this change. Therefore, threshold 24 may be increased as a function of the change in acceleration signal 25. In this context, the changes in acceleration may be divided into intervals and a threshold change may be assigned to each of these intervals. Consequently, a quantization may exist.

Figure 7:
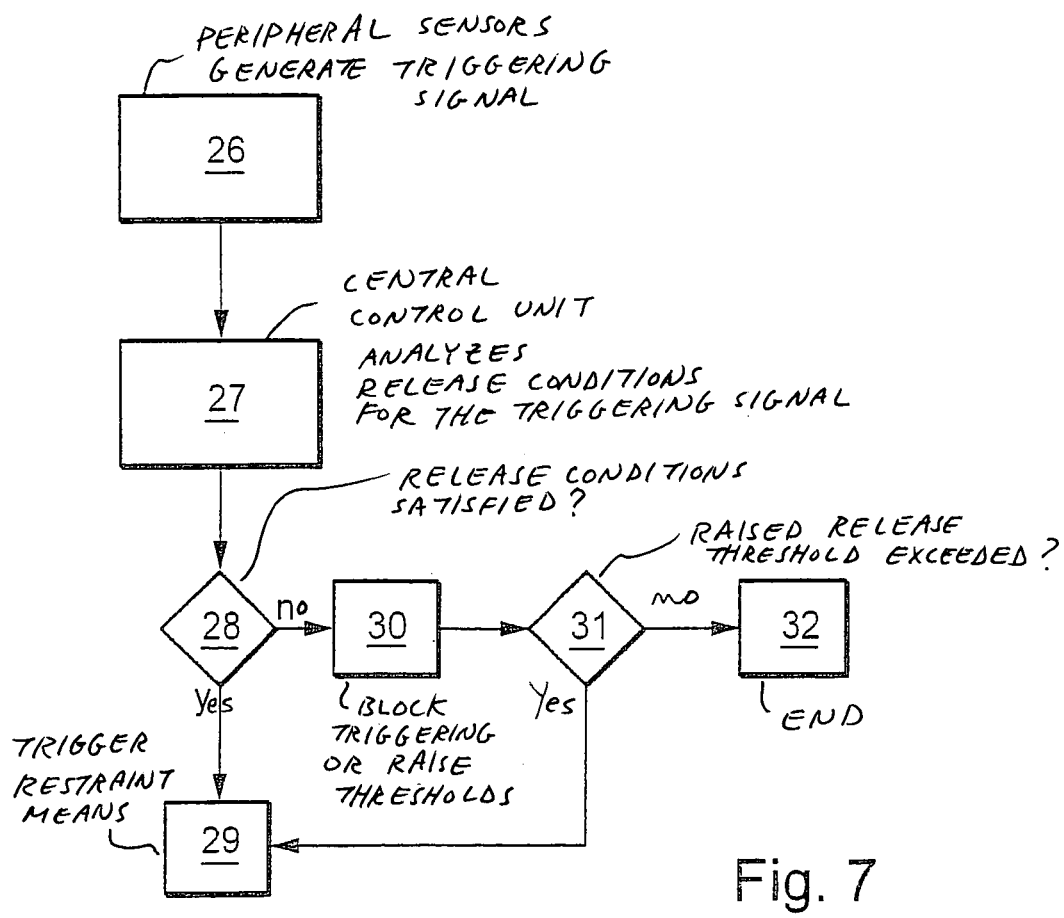
FIG. 7 shows a flow chart of an exemplary method of the present invention.

FIG. 7 shows a flowchart of the method according to the present invention. In method step 26, the peripheral acceleration sensors may detect that restraint means are to be triggered since acceleration signals 25 have exceeded a triggering threshold 24. These triggering signals may be transmitted to a central control unit 2. In method step 27, central control unit 2 may check on the basis of its own acceleration signals acquired by centrally situated acceleration sensors 8 and 11 whether these triggering signals may be released. In method step 28, this may be checked as shown above on the basis of release threshold 16 or 15 or on the basis of an existing blocking of the triggering signal. In this context, a check may also be made to determine whether rescue band 39 is being exceeded.

If the signals may be released, the restraint means may be triggered in method step 29. If this is not the case, release thresholds 16 may be raised for a predefined time in method step 30 or the triggering signal may be blocked. Method step 31 may check whether raised release threshold 15 or rescue band 39 is being exceeded. If that is the case, the triggering of the appropriate restraint means may be released in method step 29, and if this is not the case, the method may end in method step 32.

The method of the present invention may always start as soon as peripheral acceleration sensors 3-7 detect a side impact. However, it may also be used for other types of impact.

What is claimed is:

1. A method for triggering at least one restraint arrangement, comprising:
   releasing, for the at least one restraint arrangement, a triggering signal from a peripheral acceleration sensor situated in a vehicle depending on a signal from another acceleration sensor that is centrally positioned in the vehicle to trigger the at least one restraint arrangement, wherein the released triggering signal from the peripheral acceleration sensor triggers the at least one restraint arrangement;
   wherein, when the signal from the another acceleration sensor exceeds a first threshold value that is higher than a release threshold, one of: a) raising a release threshold for the signal from the another acceleration sensor for a first predefined time; and b) blocking the releasing of the triggering signal from the peripheral acceleration sensor for a second predefined time; and
   wherein, when the signal from the another acceleration sensor exceeds a second threshold value that is higher than the first threshold value, releasing the triggering signal from the peripheral acceleration sensor to trigger the at least one restraint arrangement.

2. The method as recited in claim 1, wherein the signal sensor corresponds to one of an acceleration and a cumulative acceleration.

3. The method as recited in claim 1, wherein the releasing of the triggering signal is blocked for the second predefined time when one of a cumulative acceleration passes through a sign change due to a zero crossing and the cumulative acceleration reaches the threshold value.

4. The method as recited in claim 1, wherein the triggering signal is always released when a cumulative transversal acceleration measured by the other acceleration sensor exceeds a rescue range in the vehicle.

5. The method as recited in claim 1, further comprising:
   setting a triggering threshold for the peripheral acceleration sensor as a function of an acceleration change.

6. The method as recited in claim 1, wherein:
   the method first starts when a noise range for the signal from the other acceleration sensor is exceeded.

7. The method as recited in claim 2, further comprising:
   causing an integrator for summing up more than one acceleration.

8. The method as recited in claim 7, further comprising:
   determining the more than one acceleration in a plurality of different sensing directions.

9. A device in a vehicle for triggering at least one restraint arrangement, comprising:
   a processor;
   a plurality of centrally situated acceleration sensors, the plurality of centrally situated acceleration sensors connectable to the processor for triggering the at least one restraint arrangement; and
   at least one peripheral acceleration sensor connectable to the plurality of centrally situated acceleration sensors, wherein when a signal from at least one of the centrally situated acceleration sensors exceeds a first threshold value that is higher than a release threshold for the signal from the at least one of the centrally situated acceleration sensor, the processor one of (a) raising the release threshold for the signal from the at least one of the centrally situated acceleration sensors for a first predefined time and (b) blocking a releasing of a triggering signal from the at least one peripheral acceleration sensor for a second predefined time, and wherein when the signal from the at least one of the centrally situated acceleration sensors exceeds a second threshold value that is higher than the first threshold value, releasing the triggering signal from the at least one peripheral acceleration sensor to trigger the at least one restraint arrangement.

10. The device as recited in claim 9, wherein the plurality of centrally situated acceleration sensors are arranged in a plurality of different sensing directions.

* * * * *